United States Patent
Kahan et al.

(10) Patent No.: US 8,938,502 B2
(45) Date of Patent: *Jan. 20, 2015

(54) SUBSCRIBER DEVICE AND SUBSCRIPTION MANAGEMENT THAT SUPPORTS REAL-TIME COMMUNICATION

(71) Applicant: International Business Machines Corporation, Armonk, NY (US)

(72) Inventors: Eduardo T. Kahan, Longwood, FL (US); Chuan Feng Li, Marsfield (AU); Xiao Xing Liang, Beijing (CN); Yu Chen Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/961,944

(22) Filed: Aug. 8, 2013

(65) Prior Publication Data

US 2013/0339448 A1    Dec. 19, 2013

Related U.S. Application Data

(63) Continuation of application No. 12/732,232, filed on Mar. 26, 2010, now Pat. No. 8,543,646.

(30) Foreign Application Priority Data

Mar. 31, 2009   (CN) .......................... 2009 1 0129572

(51) Int. Cl.
*G06F 15/173* (2006.01)
*H04L 29/08* (2006.01)
(Continued)

(52) U.S. Cl.
CPC ............ *H04L 67/02* (2013.01); *H04L 12/1859* (2013.01); *H04L 12/58* (2013.01); *H04L 67/24* (2013.01); *H04L 67/306* (2013.01)
USPC ........................... 709/204; 709/217; 707/610

(58) Field of Classification Search
None
See application file for complete search history.

(56) References Cited

U.S. PATENT DOCUMENTS 5,884,324 A * 3/1999 Cheng et al. .......................... 1/1
2007/0106753 A1  5/2007 Moore
(Continued)

FOREIGN PATENT DOCUMENTS

CN       101395592 A       3/2009

OTHER PUBLICATIONS

Chinese Office Action dated May 20, 2013 for Chinese Patent Application Serial No. 200910129572.9, filed Mar. 31, 2009; see p. 5.

*Primary Examiner* — Moustafa M Meky
*Assistant Examiner* — Clayton R Williams
(74) *Attorney, Agent, or Firm* — Thomas E. Lees, LLC

(57) ABSTRACT

Subscription management for resource content is disclosed. A subscriber device selects an event topic based on an event topic list. The subscriber device creates a topic path for the selected event topic to receiving a notification event related to the selected event topic. The subscriber device sends path information of the created topic path as part of identification information of the subscriber device, along with the selected event topic, to a resource content publishing device, and the topic path indicates a document. The subscriber device receives the notification event sent by the resource content publishing device to the subscriber device according to the identification information of the subscriber device, wherein at least one field of the document indicates the receipt of the notification event.

13 Claims, 5 Drawing Sheets

(51) Int. Cl.
*H04L 12/18* (2006.01)
*H04L 12/58* (2006.01)

(56) References Cited

U.S. PATENT DOCUMENTS

| | | |
|---|---|---|
| 2007/0168420 A1 | 7/2007 | Morris |
| 2007/0192401 A1 | 8/2007 | Weakliem et al. |
| 2008/0034056 A1 | 2/2008 | Renger et al. |
| 2008/0086755 A1 | 4/2008 | Darnell et al. |
| 2008/0267221 A1* | 10/2008 | Ozzie et al. .................. 370/503 |
| 2009/0157731 A1* | 6/2009 | Zigler et al. .................. 707/102 |
| 2009/0171988 A1* | 7/2009 | Kikin-Gil .................. 707/100 |
| 2009/0195806 A1* | 8/2009 | Ohashi .................. 358/1.13 |

* cited by examiner

SUBSCRIBER DEVICE AND SUBSCRIPTION MANAGEMENT THAT SUPPORTS REAL-TIME COMMUNICATION

CROSS-REFERENCE TO RELATED APPLICATIONS

This application is a continuation of U.S. patent application Ser. No. 12/732,232, filed Mar. 26, 2010, entitled "SUBSCRIBER DEVICE AND SUBSCRIPTION MANAGEMENT THAT SUPPORTS REAL-TIME COMMUNICATION", now allowed, which claims the benefit of Chinese Patent Application No. 200910129572.9, filed Mar. 31, 2009, the disclosures of which are incorporated herein by reference.

BACKGROUND

Embodiments of the present invention relate to eventing technologies for resource content, and in particular to subscriber devices and subscription management thereof. Embodiments of the present invention further relate to real-time communication for resource content.

Web 2.0 technologies are rapidly being adopted by industries, and eventing has become an important mechanism for communication between applications using Web 2.0 technologies.

The Atom standard is a Web 2.0 eventing mechanism defined by the Internet Engineering Task Force (IETF), which defines both a feed format for representing Web resources and a protocol for editing Web resources. The feed format enables Web content syndication and the protocol enables agents to interact with Web sources. In this regard, the Atom Publishing Format and Protocol Working Group of the IETF has developed two technologies relevant to content syndication. The Atom Syndication Format (RFC 4287), referred to herein as "Atom", is an Atom format in IETF terminology. The Atom Publishing Protocol (RFC 5023), referred to herein as "AtomPub", is an application-level protocol for publishing and editing Web resources. However, Atom and AtomPub are primarily defined for publishing the abstract and syndication of Web content for browser based clients. More particularly, Atom feed providers only use the AtomPub protocol to create/update/delete feeds, and Atom feed users retrieve feeds from an Atom feed server by implementing pulling functions to get the latest content. Therefore, the efficiency of eventing fully depends on the frequency of retrieving operations by users, and the Atom and AtomPub in the conventional art do not support real-time eventing.

Bayeux is a protocol for transporting asynchronous messages over HTTP. The primary purpose of Bayeux is to implement responsive user interactions for Web clients using Asynchronous JavaScript and XML (Ajax), and Comet (a server-push technique). The Bayeux protocol supports two transport types of Comet: Streaming transport and Long Polling transport, both of which require long run HTTP sessions between a client and a server. Moreover, the whole eventing session requires the client and the server to be available. Therefore, resource consumption is high. Still further, Bayeux is not a real-time eventing mechanism.

BRIEF SUMMARY

According to an aspect of the present invention, a subscriber device selects an event topic based on an event topic list. The subscriber device creates a topic path for the selected event topic to receiving a notification event related to the selected event topic. Further, the subscriber device sends path information of the created topic path as part of identification information of the subscriber device, along with the selected event topic, to a resource content publishing device, and the topic path indicates a document. Moreover, the subscriber device receives the notification event sent by the resource content publishing device to the subscriber device according to the identification information of the subscriber device, wherein at least one field of the document indicates the receipt of the notification event.

According to a further aspect of the present invention, a subscriber device selects an event topic based on an event topic list. The subscriber device creates a default topic path for the selected event topic to receiving a notification event related to the selected event topic. Further, the subscriber device sends default path information of the created topic path as part of identification information of the subscriber device, along with the selected event topic, to a resource content publishing device. Moreover, the subscriber device receives the notification event sent by the resource content publishing device to the subscriber device at the default topic path.

BRIEF DESCRIPTION OF THE SEVERAL VIEWS OF THE DRAWINGS

The following detailed description of various embodiments and other aspects of the present invention can be best understood when read in conjunction with the following drawings, where like structure is indicated with like reference numerals, and in which.

DETAILED DESCRIPTION

Figure 1:
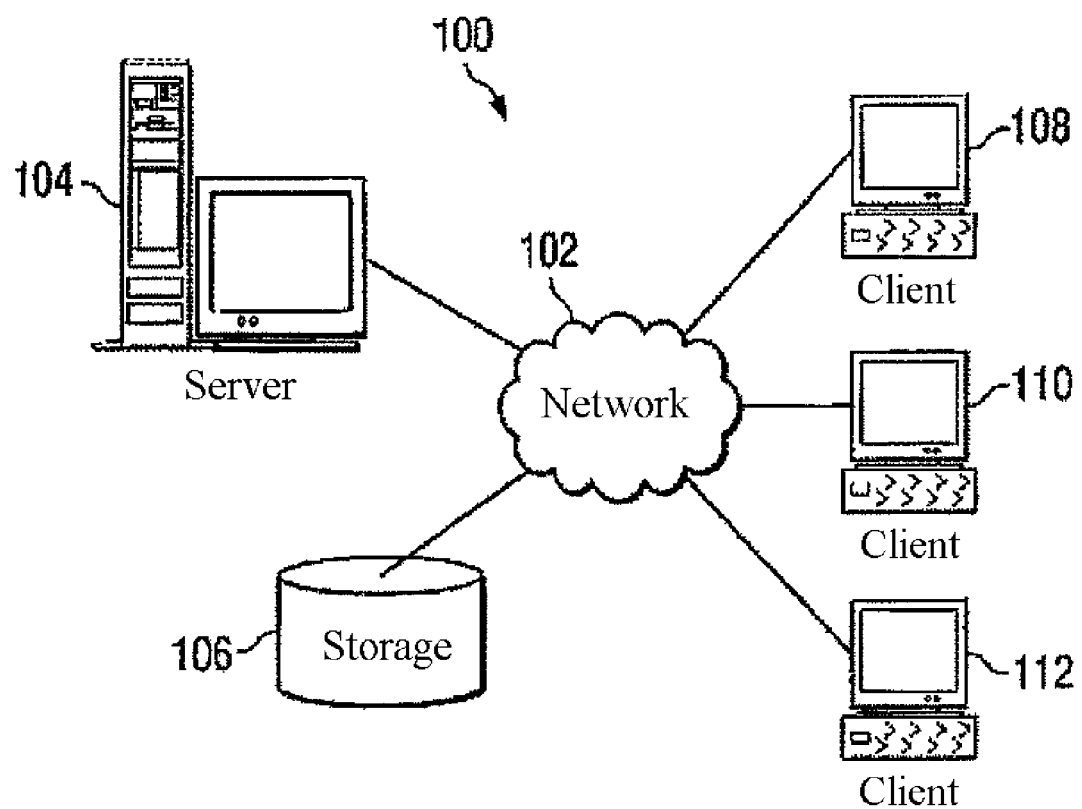
FIG. 1 is a block diagram illustrating a distributed data processing system in which various aspects of the present invention may be implemented.

Now referring to the figures, in particular to FIG. 1, a block diagram of a distributed data processing system, i.e., a computer network, is described, in which various aspects of the present invention may be implemented. The distributed data processing system 100 contains a network 102, which is a medium providing communication links between different devices and computers connected within the distributed data processing system 100.

In the depicted example, a server 104 and a storage 106 are connected to the network 102. In addition, clients 108, 110 and 112, such as workstations, personal computers, cell phones and PDAs, are also connected to the network 102. In the depicted example, the server 104 provides data (e.g., boot files), operating system and applications for the clients 108, 110 and 112. The distributed data processing system 100 may include additional servers, clients or other devices not shown in the figure. In the depicted example, the distributed data processing system 100 is the Internet, and the network 102 represents a collection of networks and gateways that use the TCP/IP protocol suite to communicate with one another. Alternatively, the distributed data processing system 100 may also be implemented as a number of different types of networks.

FIG. 1 is intended as an example, instead of an architectural limitation of the a distributed data processing system according to aspects of the present invention. Many modifications may be made to the system shown in FIG. 1 without departing from the spirit and scope of the embodiments of the present invention described more fully herein.

Aspects of the present invention may be implemented as a data processing system of the sever 104 shown in FIG. 1. The data processing system may be a symmetric multiprocessor (SMP) system including a plurality of processors connected to a system bus. Alternatively, a single processor system may be adopted. Various aspects of the present invention may also be implemented as a data processing system of the client computers in FIG. 1.

First Embodiment

Figure 2:
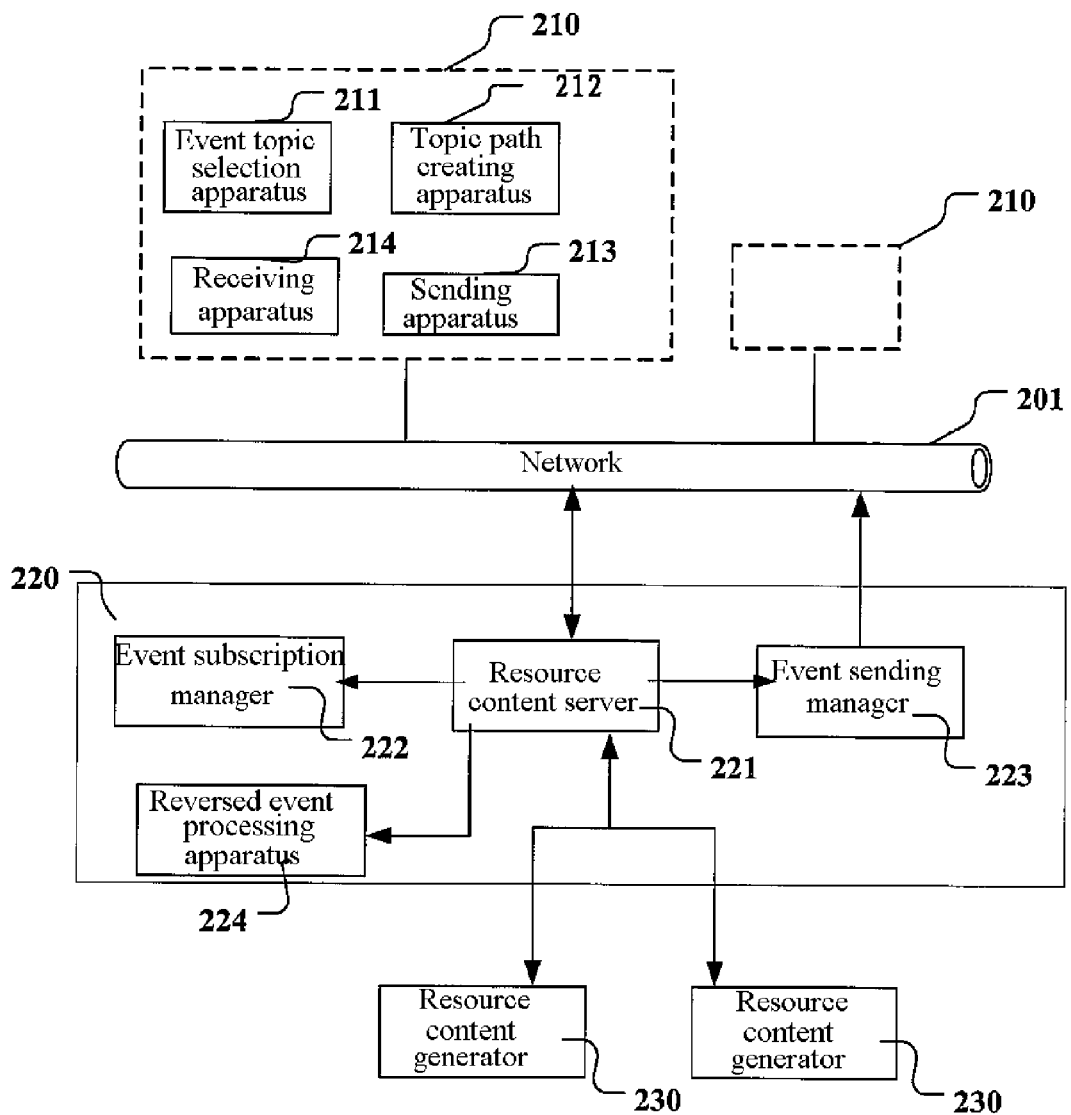
FIG. 2 is a schematic diagram illustrating a subscriber device and a real-time communication system including the subscriber device according to aspects of the present invention.
Figure 3A:
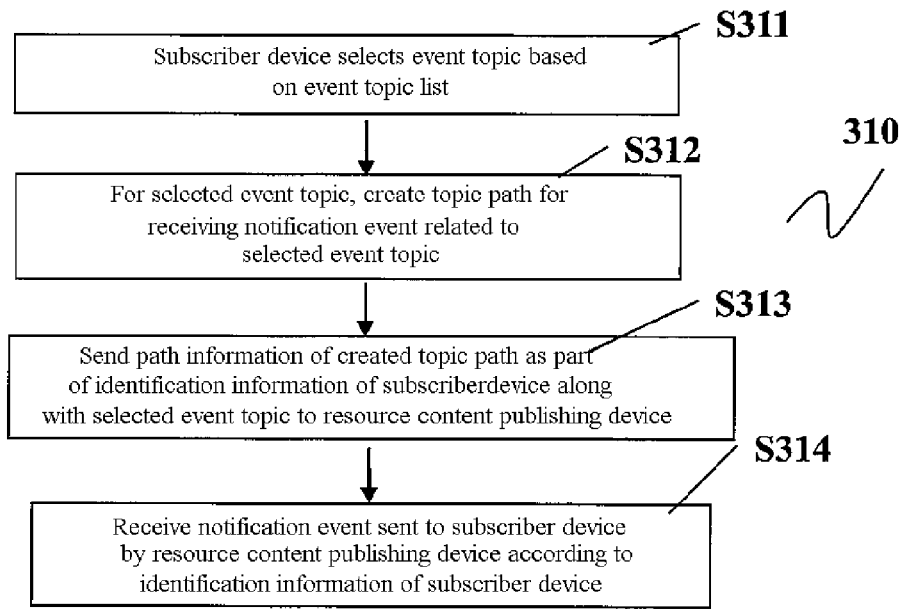
FIG. 3a is a flow chart of a resource content subscription management method of a subscriber device according to various aspects of the present invention.
Figure 3B:
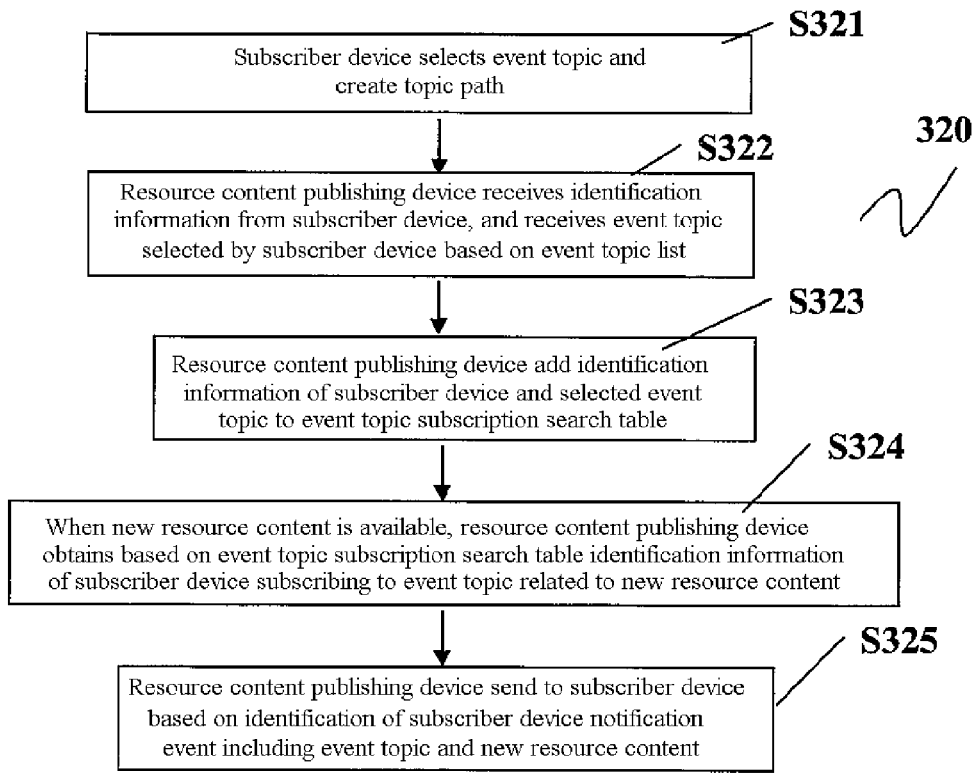
FIG. 3b is a flow chart of a real-time communication method for resource content according to various aspects of the present invention.

Various aspects of the present invention provide a subscriber device, a subscription management method thereof, and a real-time communication method and system for resource content. FIG. 2 illustrates a block diagram of a subscriber device and a real-time communication system including the subscriber device. FIG. 3a illustrates a flow chart of a resource content subscription management method of the subscriber device. Correspondingly, FIG. 3b illustrates a flow chart of a real-time communication method for resource content.

As illustrated in FIG. 2, the real-time communication system for resource content includes a resource content publishing device 220 and at least one subscriber device 210 capable of communicating with one another via a network 201. The resource content publishing device 220 may be connected with at least one external resource content generator 230, so as to obtain event topics and resource content in a predetermined format generated by the resource content generator 230, or event topics and resource content sent by the resource content generator 230 to the resource content publishing device 220. Alternatively, the resource content generator 230 may be located inside the resource content publishing device 220, so that the resource content publishing device 220 may receive event topics and resource content in various formats generated by the resource content generator 230.

The subscriber device 210 includes an event topic selection apparatus 211, a topic path creating apparatus 212 and a sending apparatus 213. The event topic selection apparatus 211 is configured to select an event topic based on an event topic list. The topic path creating apparatus 212 is configured to create, for the selected event topic, a topic path for receiving a notification event related to the selected event topic. The sending apparatus 213 is configured to send path information of the created topic path as part of identification information of the subscriber device along with the selected event topic to the resource content publishing device 220. The subscriber device 210 further includes a receiving apparatus 214 configured to receive the notification event sent by the resource content publishing device 220 according to the identification information of the subscriber device to the subscriber device.

The resource content publishing device 220 includes a resource content server 221, an event subscription manager 222, an event sending manager 223 and a reversed event processing apparatus 224. The resource content server 221 is configured to receive the identification information of the subscriber device from the subscriber device 210, and to receive the event topic selected by the subscriber device 210 based on the event topic list. The event subscription manager 222 is configured to add the received identification information of the subscriber device and the selected event topic, to an event topic subscription search table.

When new resource content is available at the resource content generator 230, based on the event topic subscription search table, the resource content server 221 obtains the identification information of the subscriber device(s) subscribing to an event topic related to the new resource content. The event sending manager 223 is configured to send a notification event including the new resource content to each corresponding subscriber device 210 according to the identification of that subscriber device.

Operations of the subscriber device 210 and the real-time communication system for resource content are described in details with reference to FIG. 3a and FIG. 3b.

FIG. 3a illustrates a resource content subscription management method 310 of the subscriber device 210. In step S311, the subscriber device 210 selects an event topic based on an event topic list. In step S312, (the topic path creating apparatus of) the subscriber device creates, for the selected event topic, a topic path for receiving a notification event related to the selected event topic. In step S313, (the sending apparatus of) the subscriber device sends path information of the created topic path as part of identification information of the subscriber device along with the selected event topic to the resource content publishing device. Subsequently, in step S314 the receiving apparatus of the subscriber device receives the notification event sent by the resource content publishing device according to the identification information of the subscriber device to the subscriber device.

FIG. 3b illustrates a real-time communication method 320 for resource content, in which step S321 covers steps S311-S314 in FIG. 3a. Based on the event topic list, the subscriber device 210 creates, for the selected event topic, a topic path for receiving a notification event related to the selected event topic. Subsequently, the subscriber device 210 sends path information of the created topic path as part of identification information of the subscriber device along with the selected event topic to the resource content publishing device 220.

Particularly, the resource content publishing device 220 creates a topic, and its resource content server 221 obtains an event topic related to resource content from the resource content generator 230, and adds the event topic to the event topic list managed by the event subscription manager 222.

The subscriber device 210 initiates a subscription and obtains the event topic list by sending a subscription request to the resource content publishing device 220. Thereby, the subscriber device 210 selects an event topic and creates for the selected event topic a topic path for receiving a notification event related to the selected event topic. The subscriber device 210 also sends to the resource content publishing device 220, the selected event topic and identification information of the subscriber device including path information of the created topic path. Alternatively, considering the fact that the subscriber device 210 may subscribe to a topic from a third-party information source, the subscriber device 210 may first obtain a topic list from the third-party information source, select an event topic and create a topic path, and send to the resource content publishing device 220 the selected event topic and subscriber device identification information including topic path information.

The path created by the subscriber device 210 for receiving the notification event related to the selected event topic may be a newly created directory folder related to the event topic, so as to receive each updated notification event related to an event topic as a corresponding new file in a corresponding topic path directory. Alternatively, it is possible to use some fields in a document (e.g., XML document) or database under the topic path related to the event topic, so that each notification event related to the event topic may be added to a corresponding part of the document.

In addition to the path information of the created topic path, the identification information of the subscriber device may include at least a Web address, e.g., URI, IP address or MAC address, of the subscriber device. Alternatively, the identification information of the subscriber device may include at least an identifier that can be converted to a Web address of the subscriber device. In the case where the identification information of the subscriber device includes at least an identifier that can be converted to a Web address of the subscriber device, (the resource content server 221 or event sending manager 223) of the resource content publishing device 220 has to convert the identification information of the subscriber device into a Web address of the subscriber device, and the event sending manager 223 sends the notification event according to the Web address.

The resource content publishing device 220 receives the identification information of the subscriber device from the subscriber device 210, and receives the event topic selected by the subscriber device 210 based on the event topic list (step S322). Then, the resource content publishing device 220 adds the identification information of the subscriber device and the selected event topic to the event topic subscription search table (step S323). When new resource content is available, the resource content publishing device 220 obtains, based on the event topic subscription search table, the identification information of the subscriber device subscribing to an event topic related to the new resource content (step S324), and the resource content publishing device 220 sends a notification event including the event topic and the new resource content to the subscriber device 210 according to the identification of the subscriber device (step S325).

For the selected event topic, the subscriber device 210 creates a topic path for receiving each notification event related to the selected event topic, and has the resource content publishing device 220 obtain the topic path so that the resource content publishing device 220 may send the notification event directly to the topic path. Therefore, the real-time communication method and system according to aspects of the present invention fully realize real-time eventing in push mode, and avoid the drawbacks of eventing by polling or long-live sessions in the conventional art.

Furthermore, according to the first embodiment, different topic paths receive notification events of different event topics. Therefore the subscriber device 210 may manage the notification events of different event topics conveniently, e.g., perform a corresponding process on a received event (consumption, news reading, mp3 downloading, etc.) after receiving the updated notification event.

To cancel subscription to a topic, the subscriber device 210 sends to the resource server 221 of the resource content publishing device 220 a topic subscription cancelation request. The resource content server 221 deletes the event topic and corresponding subscriber device identification information from the event topic subscription search table in the event subscription manager 222.

Subscriber Device Generates Reversed Event:

Further, the subscriber device and the subscription management method, and the real-time communication method and system for resource content according to various aspects of the present invention may facilitate bidirectional real-time eventing between the resource content publishing device 220 and the subscriber device 210. The subscriber device 210 may further include a reversed event generator configured to create a reversed event in response to a received notification event or create a reversed event independently. The reversed event includes reversed event content edited by the subscriber device 210, or the reversed event includes the reversed event content and an event topic which is replicated by the subscriber device 210, which is the same as that of the notification event concerned. In this regard, the resource content publishing device 220 may accordingly perform one or more actions based on the event topic in response to reception of the reversed event. In order for the subscriber device 210 to create the reversed event independently, the selected event topic may be included in attribute information of the topic path of the subscriber device.

The reversed event may include only the reversed event content edited by the subscriber device 210. Therefore, for reversed events related to different event topics, a topic path for receiving a reversed event of a corresponding event topic needs to be created at the resource content publishing device 220, and the identification information of the resource content publishing device including the topic path may be added in e.g., the event topic list. While obtaining the event topic list and selecting an event topic of interest, the subscriber device 210 may obtain the topic path of the corresponding event topic, therefore the subscriber device 210 may send a reversed event directly to the topic path at the resource content publishing device 220 according to the identification information of the resource content publishing device.

Topic paths at the resource content publishing device 220 and the subscriber device 210 for the same event topic may be the same, or different. For example, the resource content publishing device 220 and the subscriber device 210 may use the same topic path for receiving notification events of the same event topic, and may also use a topic name as part of the path name. Therefore, the subscriber device 210 may send a reversed event, which includes only the reversed event content, to the topic path of the resource content publishing device 220 according to a Web address of the resource content publishing device. The Web address used as the identification information of the resource content publishing device may be obtained by the subscriber device 210 before initiating a subscription request similarly to how it is done in the conventional art.

Alternatively, the reversed event may include the reversed event content and an event topic which is replicated by the subscriber device 210 and is the same as that of the notification event concerned. Therefore, the selected event topic and the identification information (which may, alternatively, include only a Web address) of the resource content publishing device for providing a notification event related to the event topic, needs to be stored at the subscriber device 210. Thereby, the subscriber device 210 may send the reversed event to the resource content publishing device 220 according to the identification information of the resource content publishing device. The resource content publishing device 220 processes the reversed event according to the event topic contained in the reversed event.

For example, as shown in FIG. 2, accordingly the resource content publishing device 220 may include a reversed event processing apparatus 224 configured to process a reversed event according to an event topic. The resource content server 221 may further be configured to receive a reversed event sent by the subscriber device, and send the reversed event to the reversed event processing apparatus.

Alternate Embodiment

For the first embodiment, alternatively, the notification event may be sent to a path at the subscriber device 210 defined according to a predefined rule. The path defined according to a predefined rule may be a default path such as a temporary directory or a root path. The default path may replace the topic path created in the first embodiment to receive notification events related to any selected event topic. Therefore, the subscriber device 210 only needs to send identification information, which is constituted by a subscriber device Web address, along with the selected event topic to the resource content publishing device.

When new resource content is available, the resource content publishing device 220 sends to the subscriber device 210, a notification event consisting of the event topic and the new resource content according to the Web address of the subscriber device, and the subscriber device 210 distributes the notification event to a corresponding topic path according to the event topic and a search table of topic paths. In the case where notification events are distributed to respective topic paths inside the subscriber device 210, the notification events arrived at the respective topic paths may include only the event content and include no event topics. Alternatively, the subscriber device 210 no longer creates a topic path, but performs consumption directly in the default path according to the event topic.

Alternatively, the path defined according to a predefined rule may be a predefined path having a path name which is the event topic. In that case, the predefined path may also replace the topic path created in the first embodiment to receive notification events related to the selected event topic. And while sending the selected event topic, the subscriber device 210 does not need to send path information of the predefined path as part of its identification information to the resource content publishing device 220. The resource content publishing device 220 just needs to obtain the predefined rule for defining paths, then the resource content publishing device 220 can send new resource content directly to a particular predefined path after obtaining the new resource content.

In the alternate embodiment, the subscriber device 210 may send the identification information of the subscriber device while sending the selected event topic to the resource content publishing device 220, or send the identification information of the subscriber device while sending the subscription request to the resource content publishing device 220.

In the alternate embodiment, in order to realize bidirectional eventing, the subscriber device 210 may create a mapping table (search table) between the selected event topic and the identification information (including a Web address, or including a Web address and a remote topic path) of the resource content publishing device. In the case where a particular topic path is created by the subscriber device, a mapping table among the selected event topic, a local topic path and the identification information of the resource content publishing device may be created.

Applied to Web 2.0:

The subscriber device 210 and the subscription management method thereof, and the real-time communication method and system for resource content according to various aspects of the present invention may process resource content in any forms, especially resource content applied in Web 2.0. According to aspects of the present invention, the event sending manager 223 in the resource content publishing device 220 may use a format convertor (not shown in the figure) to convert resource content in any forms or an event topic and the resource content into feed information in the RSS or Atom format, and send the feed information to the subscriber device 210 according to a protocol for the RSS or Atom feed format. Therefore, the drawback of traditional XML transport protocols such as the AtomPub protocol that two protocols and eventing mechanisms need to be configured to realize resource content receiving and notification event publishing is avoided. While applied in Web 2.0 systems, aspects of the present invention do not require other protocols used separately, therefore simplicity is achieved.

When the resource content publishing device 220 obtains new resource content in the RSS or Atom feed format from an external resource content generator 230, the event sending manager 223 may send the new resource content in the RSS or Atom feed format to a topic path of the subscriber device according to the corresponding RESTful or AtomPub protocol. Alternatively, in the case where the topic path is not obtained, the event sending manager 223 may pack the event topic and the new resource content as feed information in the same format and send it to (a default path of) the subscriber device according to the RESTful or AtomPub protocol. In this regard, the event sending manager 223 does not need to convert the event topic into the feed information if it is sent to the topic path of the subscriber device directly.

Because notification events are sent in the real time using Web 2.0 formats and protocols, HTTP operation methods may be simply mapped to operation methods for the events. For example, the list of available topics may be obtained using the HTTP/GET operation, the HTTP/DELETE operation may be mapped as subscription cancellation, and the HTTP/PUT operation may be mapped as the sending of event information.

Second Embodiment

Figure 4:
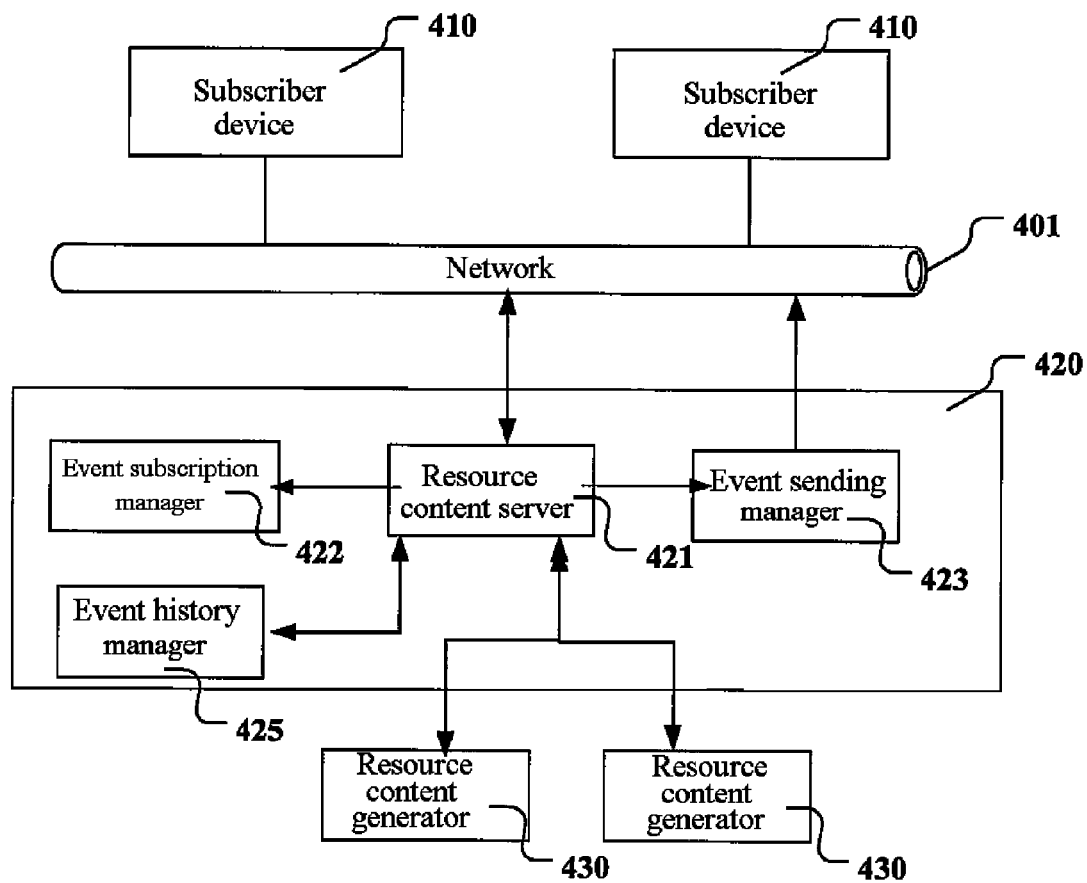
FIG. 4 is a schematic diagram illustrating a system according to further aspects of the present invention.

FIG. 4 illustrates a second embodiment of the real-time communication system for resource content according to aspects of the present invention. The illustrated real-time communication system for resource content includes a resource content publishing device 420 and at least one subscriber device 410 capable of communicating with one another via a network 401. The resource content publishing device 420 may be connected with at least one external resource content generator 430. The resource content publishing device 420 includes a resource content server 421, an event subscription manager 422 and an event sending manager 423. Similarly, the real-time communication system for resource content may also process reversed events as described more fully herein.

In the second embodiment, the resource content publishing device 420 further includes an event history manager 425. The event history manager 425 is connected with the resource content server 421, and is configured to generate event change history information related to a predetermined event topic by recording the content of notification events related to the predetermined event topic (e.g., all event topics) and by recording the content of corresponding sending and receiving changes. The resource content server 421 is further configured to send to the subscriber 410, a link to the event change history information, so that the subscriber device may obtain the event change history information via the link.

Third Embodiment

Event topics for selection by the subscriber device may be represented by a complex event topic set constituted by at least two separate event topics with a predetermined relation there between. The complex event topic set is generated by the resource content server (221 or 421) combing or composing according to a predefine rule, at least two separate event topics provided by at least one resource content generator (230 or 430).

After the subscriber device selects a complex event topic set to be the subscribed topic, when new resource content is available, the resource content server (221 or 421) determines whether the event topic of the new resource content belongs to the complex event topic set. If it is determined that the event topic of the new resource content belongs to the complex event topic set, the resource content server (221 or 421) creates a complex event by applying a predefined rule to the new resource content, where the predefined rule describes the relation between separate events related to the complex event topic set. For instance, a complex event may be created by modifying or otherwise combining original events. Moreover, the resource content server (221 or 421) sends the complex event to the subscriber device.

For example, if the relation between at least two topics in the complex event topic set is simple combination, then the resource content server generates a complex event by combining simple events related to the at least two topics. If the relation between at least two topics in the complex event topic set is a predetermined event mode (e.g., multiple events need to be output in a predetermined order, or multiple events have other mutual limitations), then the resource content server (221 or 421) generates a complex event by processing simple events related to the at least two topics according to a rule describing the predetermined event mode (e.g. nesting or composing the simple events in the predetermined order).

Similarly, the real-time communication system for resource content of the third embodiment may be combined with the first embodiment, the second embodiment and other alternate embodiments (e.g. with reversed event processing or using Web 2.0 formats).

Fourth Embodiment

Figure 5:
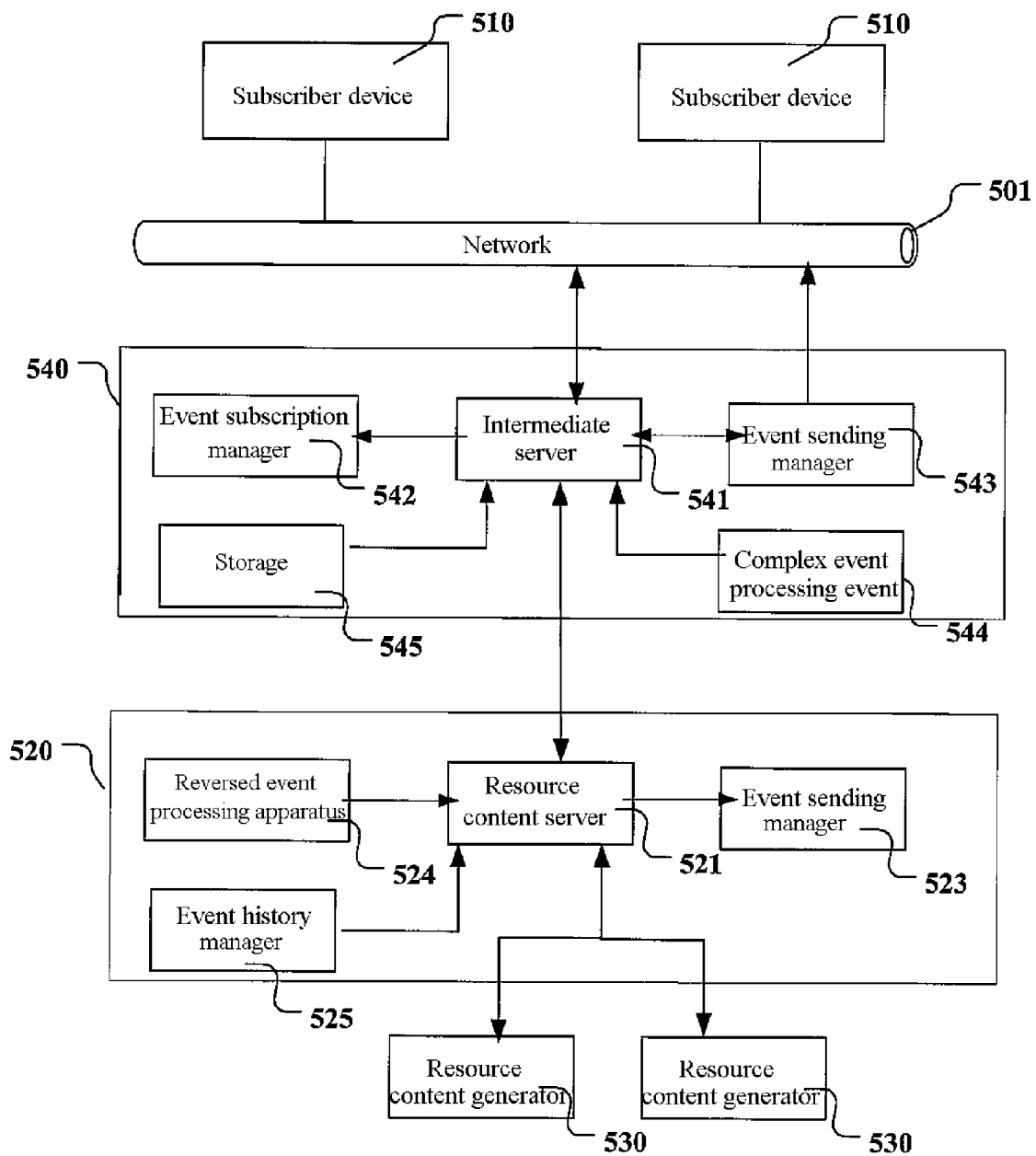
FIG. 5 is a schematic diagram illustrating a system according to still further aspects of the present invention.

FIG. 5 illustrates a fourth embodiment of the real-time communication system for resource content according to aspects of the present invention. The real-time communication system for resource content includes a resource content publishing device 520 connected with at least one resource content generator 530, at least one subscriber device 510, and an intermediate device 540 connected between the resource content publishing device and the subscriber device. Compared with the second embodiment, the intermediate device 540 of the fourth embodiment is integrated with the event subscription manager and the event sending manager. Therefore, the load on the Web side server (i.e. the resource content publishing device 520) may be reduced, and services such as event subscription, event updating, subscription cancelation and event sending may be provided to at least two resource content publishing devices.

The subscriber device 510 is configured to select an event topic based on a event topic list, create for the selected event topic a topic path for receiving a notification event related to the selected event topic, and send path information of the created topic path as part of identification information of the subscriber device along with the selected event topic to the resource content publishing device 520.

The resource content publishing device 520 may include a resource content server 521 for publishing to the intermediate device 540, resource content generated by the resource content generator 530. In the case where the resource content publishing device 520 includes the resource content generator 530, alternatively the resource content publishing device 520 may include an event sending manager for sending resource content according to a predetermined format.

The intermediate device 540 includes an intermediate server 541, an event subscription manager 542 and an event sending manager 543. The intermediate server is configured to receive the identification information of the subscriber device from the subscriber device 510 via the network 501, and receive the event topic selected by the subscriber device based on the event topic list. The event subscription manager 542 is configured to add the identification information of the subscriber device and the selected event topic to an event topic subscription search table, wherein when new resource content is available at the resource content server 521, the intermediate server obtains, based on the search table managed by the event subscription manager 542, the identification information of the subscriber device subscribing to an event topic related to the new resource content. The event sending manager 543 is configured to send a notification event including the event topic and the new resource content to the subscriber device 510.

The real-time communication system for resource content of the fourth embodiment may be used in combination with the second embodiment (event history management), the third embodiment (complex event management), and other alternate embodiment (e.g. with reversed event processing or using Web 2.0 formats).

For example, as shown in the FIG. 5, the resource content publishing device 520 may include an event history manager 525 for generating event change history information related to a predetermined event topic. The resource content server 521 obtains the event change history information from the event history manager 525.

The intermediate server 540 in the intermediate device 540 is configured to obtain the event change history information (e.g., by checking periodically in the form of podcasting whether the resource content server 521 has new event change history information) from the resource content server 521. The intermediate server 540 may further store the event change history information in a storage 545 (e.g., a cache). The intermediate server 540 may also send a link to the event change history information to the subscriber device 510 subscribing to the predetermined event topic, so that the subscriber device may obtain the event change history information via the link.

Similarly, complex event management may be implemented in the real-time communication system for resource content of the fourth embodiment. First, the intermediate server 541 in the intermediate device 540 generates a complex event topic set by combining or composing according to a predefined rule at least two separate event topics provided by at least one resource content server 521, and send it to e.g., the event subscription manager 541 to manage the same.

After the subscriber device 510 subscribes to the complex event topic set from the intermediate server 540, the intermediate device 541 determines whether the event topic of the new resource content obtained from the resource content server 512 of the resource content publishing device 520 belongs to the complex event topic set. If the event topic of the new resource content belongs to the complex event topic set, a complex event processing apparatus 544 of the intermediate device 540 creates a complex event. A complex event is created, for example, by applying to the new resource content, a predefined rule describing the relation between separate events related to the complex event topic set, e.g., in a manner analogous to that set out in greater detail herein with reference to the third embodiment.

In the case where reversed event processing is included, the subscriber device 510 sends a generated reversed event to the intermediate server 541. The intermediate server 541 (or the event sending manager 543) forwards the reversed event to the resource content server 521 in order for the reversed event processing apparatus 524 to perform accordingly. In this case, preferably, the event topic subscription search table managed by the event subscription manager 542 includes the identification information of the subscriber device and the selected event topic, as well as identification information of the resource content publishing device 520 providing resource content related to the selected event topic.

If the subscriber device 510 generates a reversed event for a complex event topic set, the intermediate server 541 send the reversed event to the complex event processing apparatus 544 after receiving the same. The complex event processing device 544 obtains each of separate original topics according to the complex event topic set, and obtains identification information of a corresponding resource content publishing device 520 providing each of the separate original topics, so as to send to a corresponding resource content publishing device 520 for processing.

Various aspects of the present invention provide a subscriber device and a subscription management method thereof, and a real-time communication method and system for resource content. The subscriber device and the subscription management method thereof are used to facilitate the receiving of resource content from resource content publishing devices by the subscriber device, and the real-time communication method and system are used to push information to interested users (subscriber devices) in real time.

According to aspects of the present invention, a real-time communication method for resource content is provided, comprising selecting based on an event topic list, by a subscriber device, an event topic, creating for the selected event topic a topic path for receiving a notification event related to the selected event topic, and sending path information of the created topic path as part of identification information of the subscriber device, along with the selected event topic, to a resource content publishing device. The method further comprises receiving from the subscriber device, by the resource content publishing device, the identification information of the subscriber device and the selected event topic, and adding the identification information of the subscriber device and the selected event topic to an event topic subscription search table. The method also comprises, if new resource content is available, obtaining based on the event topic subscription search table, by the resource content publishing device, identification information of a subscriber device subscribing to an event topic related to the new resource content and sending a notification event including the new resource content to the subscriber device.

According to still other aspects of the present invention, a subscriber device is provided, comprising an event topic selection apparatus, configured to select an event topic based on an event topic list, a topic path creating apparatus, configured to create, for the selected event topic, a topic path for receiving a notification event related to the selected event topic, a sending apparatus, configured to send path information of the created topic path as part of identification information of the subscriber device along with the selected event topic to a resource content publishing device and a receiving apparatus, configured to receive the notification event sent by the resource content publishing device according to the identification information of the subscriber device to the subscriber device.

According to yet further aspects of the invention, a real-time communication system for resource content is provided, which comprises a subscriber device and a resource content publishing device. The subscriber device is configured to select an event topic based on an event topic list and create for the selected event topic, a topic path for receiving a notification event related to the selected event topic. The subscriber device is also configured to send path information of the created topic path as part of identification information of the subscriber device along with the selected event topic to a resource content publishing device. The resource content publishing device comprises a resource content server configured to receive the identification information of the subscriber device from the subscriber device, and to receive the event topic selected by the subscriber device based on the event topic list, an event subscription manager configured to add the identification information of the subscriber device and the selected event topic to an event topic subscription search table, wherein when new resource content is available, the resource content server obtains, based on the event topic subscription search table, the identification information of the subscriber device subscribing to an event topic related to the new resource content; and an event sending manager configured to send a notification event including the new resource content to the subscriber device according to the identification of the subscriber device.

According to further aspects of the present invention, the subscriber device creates for the selected event topic, a topic path for receiving a notification event related to the selected event topic, and the resource content publishing device obtains the topic path, so that the resource content publishing device sends the notification event directly to the topic path. Therefore, the real-time communication method and system for resource content fully realizes real-time eventing in push mode, and avoids the drawbacks of realizing eventing via pulling or long-live session in the prior art.

Preferably, the real-time communication method and system for resource content according to aspects of the present invention may facilitate bidirectional real-time eventing between the resource content publishing device and the subscriber device. The subscriber device may create a bidirectional event in response to a received notification event or independently according to a pre-replicated subscribed event topic. The reversed event includes reversed event content edited by the subscriber device, or includes the reversed event content and an event topic which is stored by the subscriber device and is the same as that of a notification event concerned. Therefore, the resource content publishing device may process accordingly based on the event topic after receiving the reversed event.

In the case where the resource content publishing device receives reversed events, preferably, a topic path for receiving a reversed event of a corresponding event topic is created at the resource content device for reversed events of different event topics. The topic path at the resource content device and the subscriber device for the same event topic may be the same, or not the same. Preferably, the resource content publishing device and the subscriber device use the same topic path to receive notification events of the same event topic. More preferably, the topic name is used as part of the path name. If the resource content publishing device and the subscriber device use different topic paths for the same event topic, a mapping table between the subscribed event topic, and the local and remote topic path has to be built.

Preferably, the real-time communication method and system for resource content according to aspects of the present invention may process resource content in any forms, especially Web 2.0 resource content, to meet the requirement of real-time events based on Web 2.0 communications. According to aspects of the present invention, the event sending manager in the resource content publishing device may convert resource content in any forms or the resource content together with an event topic into feed information in the RSS or Atom format, and send the feed information to the subscriber device according to a protocol for the RSS or Atom feed format. While applied in Web 2.0 systems, aspects of the invention do not require complex protocols, therefore simplicity is achieved. Especially in the case where the resource content publishing device obtains new resource content from an external resource content generator, the protocol used by the original resource content (e.g., RESTful or Atompub) may be used to convert the resource content in a predetermined format, or the resource content together with the event topic may be converted into feed information in the same predetermine format, which is sent according to a corresponding protocol.

According to another aspect of the present invention, a real-time communication system for resource content is provided, including a resource content publishing device, a subscriber device, and an intermediate device connected between the resource content publishing device and the subscriber device. The subscriber device is configured to select an event topic based on an event topic list, and create for the selected event topic a topic path for receiving a notification event related to the selected event topic, and send path information of the created topic path as part of identification information of the subscriber device along with the selected event topic to the resource content publishing device. The intermediate device includes an intermediate server configured to receive the identification information of the subscriber device from the subscriber device, and receive the event topic selected by the subscriber device based on the event topic list. The intermediate device also comprises an event subscription manager configured to add the identification information of the subscriber device and the selected event topic to an event topic subscription search table, wherein when new resource content is available at the resource content server, the intermediate server obtains, based on the search table managed by the event subscription manager, the identification information of the subscriber device subscribing to an event topic related to the new resource content. The intermediate device further comprises an event sending manager configured to send a notification event including the event topic and the new resource content to the subscriber device.

Various aspects of the present invention may be employed by terminal users in applications of the client/server model, and is important for the establishing of a corporate architecture allowing server-to-server communication. The intermediate device according to the invention is integrated with an event subscription manager and an event sending manager, therefore the load on the Web side server (i.e. the resource content publishing device) may be reduced.

Other Embodiments

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

It should be understood by those skilled in the art that the scope of the various embodiments of the present invention, set out herein, are not limited to the explicit disclosure in the specification, and various variations and equivalents within the essential spirit of the embodiments of the present invention are also included.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of embodiments of the present invention have been presented for purposes of illustration and description, but is not intended to be exhaustive or limited to the embodiments of the present invention in the form disclosed. Many modifications and variations will be apparent to those of ordinary skill in the art without departing from the scope and spirit of the embodiments of the present invention.

Having thus described various embodiments of the present invention in detail herein, it will be apparent that modifications and variations are possible without departing from the scope of the embodiments of the present invention defined in the claims.

What is claimed is:

1. A method of subscription management for resource content, the method comprising:
    selecting, by a subscriber device, an event topic based on an event topic list;
    creating for the selected event topic, by the subscriber device, a topic path for receiving a notification event related to the selected event topic;
    sending, by the subscriber device, path information of the created topic path as part of identification information of the subscriber device, along with the selected event topic, to a resource content publishing device, wherein the topic path indicates a document; and
    receiving, by the subscriber device at the topic path, the notification event sent by the resource content publishing device to the subscriber device according to the identification information of the subscriber device, wherein at least one field of the document indicates the receipt of the notification event.

2. The method of claim 1, wherein the event topic selected by the subscriber device is a complex event topic set constituted by at least two separate event topics and a predefined rule describing a relation between the separate events related to the complex event topic set.

3. The method of claim 1 further comprising:
    storing the selected event topic and a Web address of the resource content publishing device at the subscriber device, wherein the Web address of the resource content publishing device is for providing the notification event related to the event topic;
    creating, by the subscriber device, a reversed event, the reversed event comprising reversed event content edited by the subscriber device and an event topic which is stored by the subscriber device and is the same as that of a corresponding notification event; and
    sending, by the subscriber device, the reversed event to the resource content publishing device according to the Web address of the resource content publishing device.

4. The method of claim 1, wherein receiving, by the subscriber device, the notification event, further comprises:
    receiving the notification at a default path; and
    distributing, by the subscriber device, the notification event to a corresponding topic path according to the event topic of the received notification event and a corresponding search table of topic paths.

5. The method of claim 1, wherein receiving, by the subscriber device, the notification event, further comprises:
    receiving the notification at a default path; and
    consuming the notification event directly in the default path.

6. The method of claim 1, wherein:
    sending, by the subscriber device, path information of the created topic path comprises identifying path information by defining paths according to at least one rule, such that the resource content publishing device can derive the appropriate path for a corresponding event notification based upon obtaining the corresponding rule.

7. Computer-readable memory with a program for subscription management for resource content stored thereon, wherein the program instructs a processor to perform:
    selecting, by a subscriber device, an event topic based on an event topic list;
    creating for the selected event topic, by the subscriber device, a topic path for receiving a notification event related to the selected event topic;
    sending, by the subscriber device, path information of the created topic path as part of identification information of the subscriber device, along with the selected event topic, to a resource content publishing device, wherein the topic path indicates a document; and receiving, by the subscriber device at the topic path, the notification event sent by the resource content publishing device to the subscriber device according to the identification information of the subscriber device, wherein at least one field of the document indicates the receipt of the notification event.

8. The computer-readable memory of claim 7, wherein the event topic selected by the subscriber device is a complex event topic set constituted by at least two separate event topics and a predefined rule describing a relation between the separate events related to the complex event topic set.

9. The computer-readable memory of claim 7, wherein the program further instructs the processor to perform:

storing the selected event topic and a Web address of the resource content publishing device at the subscriber device, wherein the Web address of the resource content publishing device is for providing the notification event related to the event topic;

creating, by the subscriber device, a reversed event, the reversed event comprising reversed event content edited by the subscriber device and an event topic which is stored by the subscriber device and is the same as that of a corresponding notification event; and sending, by the subscriber device, the reversed event to the resource content publishing device according to the Web address of the resource content publishing device.

10. The computer-readable memory of claim 7, wherein receiving, by the subscriber device, the notification event, further comprises:

receiving the notification at a default path; and distributing, by the subscriber device, the notification event to a corresponding topic path according to the event topic of the received notification event and a corresponding search table of topic paths.

11. The computer-readable memory of claim 7, wherein receiving, by the subscriber device, the notification event, further comprises:

receiving the notification at a default path; and consuming the notification event directly in the default path.

12. The computer-readable memory of claim 7, wherein:

sending, by the subscriber device, path information of the created topic path comprises identifying path information by defining paths according to at least one rule, such that the resource content publishing device can derive the appropriate path for a corresponding event notification based upon obtaining the corresponding rule.

13. The computer-readable memory of claim 7, wherein the program further instructs the processor to perform:

receiving, by the subscriber device, a link to event change history information from the resource content publishing device; and obtaining, by the subscriber device, the event change history information via the received link.

* * * * *